United States Patent
Nakamura

(10) Patent No.: US 12,387,881 B2
(45) Date of Patent: Aug. 12, 2025

(54) CAPACITOR MODULE HAVING A METAL SHEET BETWEEN ADJACENT CAPACITORS

(71) Applicant: Murata Manufacturing Co., Ltd., Nagaokakyo (JP)

(72) Inventor: Hiroaki Nakamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 344 days.

(21) Appl. No.: 17/994,042

(22) Filed: Nov. 25, 2022

(65) Prior Publication Data

US 2023/0089940 A1 Mar. 23, 2023

Related U.S. Application Data

(63) Continuation of application No. PCT/JP2021/018752, filed on May 18, 2021.

(30) Foreign Application Priority Data

May 28, 2020 (JP) ................. 2020-093502

(51) Int. Cl.
H01G 4/38 (2006.01)
H01G 2/04 (2006.01)
H01G 2/10 (2006.01)

(52) U.S. Cl.
CPC .................. *H01G 4/38* (2013.01); *H01G 2/04* (2013.01); *H01G 2/106* (2013.01)

(58) Field of Classification Search
CPC ............ H01G 4/38; H01G 2/04; H01G 2/106; H01G 4/40; H01G 4/32; H01G 4/228; H01G 4/385
See application file for complete search history.

(56) References Cited

U.S. PATENT DOCUMENTS

| 2017/0133154 | A1  | 5/2017 | Sasaki |
| 2018/0019062 | A1* | 1/2018 | Okuzuka ................ H01G 2/106 |
| 2021/0110973 | A1* | 4/2021 | Kessler .................... H01G 2/04 |

FOREIGN PATENT DOCUMENTS

| JP | H01176919 U1 | 12/1989 |
| JP | H09260180 A  | 10/1997 |

(Continued)

OTHER PUBLICATIONS

International Search Report in PCT/JP2021/018752, mailed Aug. 3, 2021, 3 pages.

*Primary Examiner* — Timothy J. Dole
*Assistant Examiner* — Daniel M Dubuisson
(74) *Attorney, Agent, or Firm* — ArentFox Schiff LLP

(57) ABSTRACT

A capacitor module that includes: a plurality of capacitors each including: a first electrode and a second electrode that face each other, and a side surface joining the first electrode and the second electrode, the side surface having a pair of flat portions that face each other, and a pair of curved portions joining the pair of flat portions to each other, the plurality of capacitors being arrayed in a row such that the flat portions of adjacent capacitors face each other; at least one metal sheet arranged in any of spaces between the flat portions of the adjacent capacitors, the at least one metal sheet being in contact with the first electrode of at least one of the adjacent capacitors; a first bus-bar electrically connected to the at least one metal sheet; and a second bus-bar electrically connected to each of the second electrodes of the plurality of capacitors.

13 Claims, 14 Drawing Sheets

(56) References Cited

FOREIGN PATENT DOCUMENTS

| | | | | |
|---|---|---|---|---|
| JP | 2009289967 | A | * 12/2009 | |
| JP | 2013251351 | A | * 12/2013 | ............... H01G 4/18 |
| JP | 5989533 | B2 | 9/2016 | |
| JP | 2020088064 | A | 6/2020 | |
| WO | 2016002177 | A1 | 1/2016 | |

* cited by examiner

CAPACITOR MODULE HAVING A METAL SHEET BETWEEN ADJACENT CAPACITORS

CROSS REFERENCE TO RELATED APPLICATIONS

The present application is a continuation of International application No. PCT/JP2021/018752, filed May 18, 2021, which claims priority to Japanese Patent Application No. 2020-093502, May 28, 2020, the entire contents of each of which are incorporated herein by reference.

FIELD OF THE INVENTION

The present invention relates to a capacitor module.

BACKGROUND OF THE INVENTION

Patent Document 1 discloses a configuration of a capacitor having a plurality of unit capacitors, where one electrode of each of unit capacitors is connected to a different element electrode plate.
Patent Document 1: JP5989533

SUMMARY OF THE INVENTION

The capacitor described in Patent Document 1 still leaves room for improvement in terms of compatibility between heat dissipation and simplification of configuration.

It is therefore an object of the present invention to provide a capacitor module having a simplified configuration as well as improved heat dissipation.

A capacitor module according to an aspect of the present invention comprises: a plurality of capacitors each including: a first electrode and a second electrode that face each other, and a side surface joining the first electrode and the second electrode, the side surface having a pair of flat portions that face each other, and a pair of curved portions that face each other and join the pair of flat portions to each other, the plurality of capacitors being arrayed in a row such that the flat portions of adjacent capacitors of the plurality of capacitors face each other; at least one metal sheet arranged in any of spaces between the flat portions of the adjacent capacitors, the at least one metal sheet being in contact with the first electrode of at least one of the adjacent capacitors; a first bus-bar electrically connected to the at least one metal sheet; and a second bus-bar electrically connected to each of the second electrodes of the plurality of capacitors.

According to the present invention, there can be provided a capacitor module having a simplified configuration as well as improved heat dissipation.

DETAILED DESCRIPTION OF THE INVENTION

Background to the Invention

Figure 1:
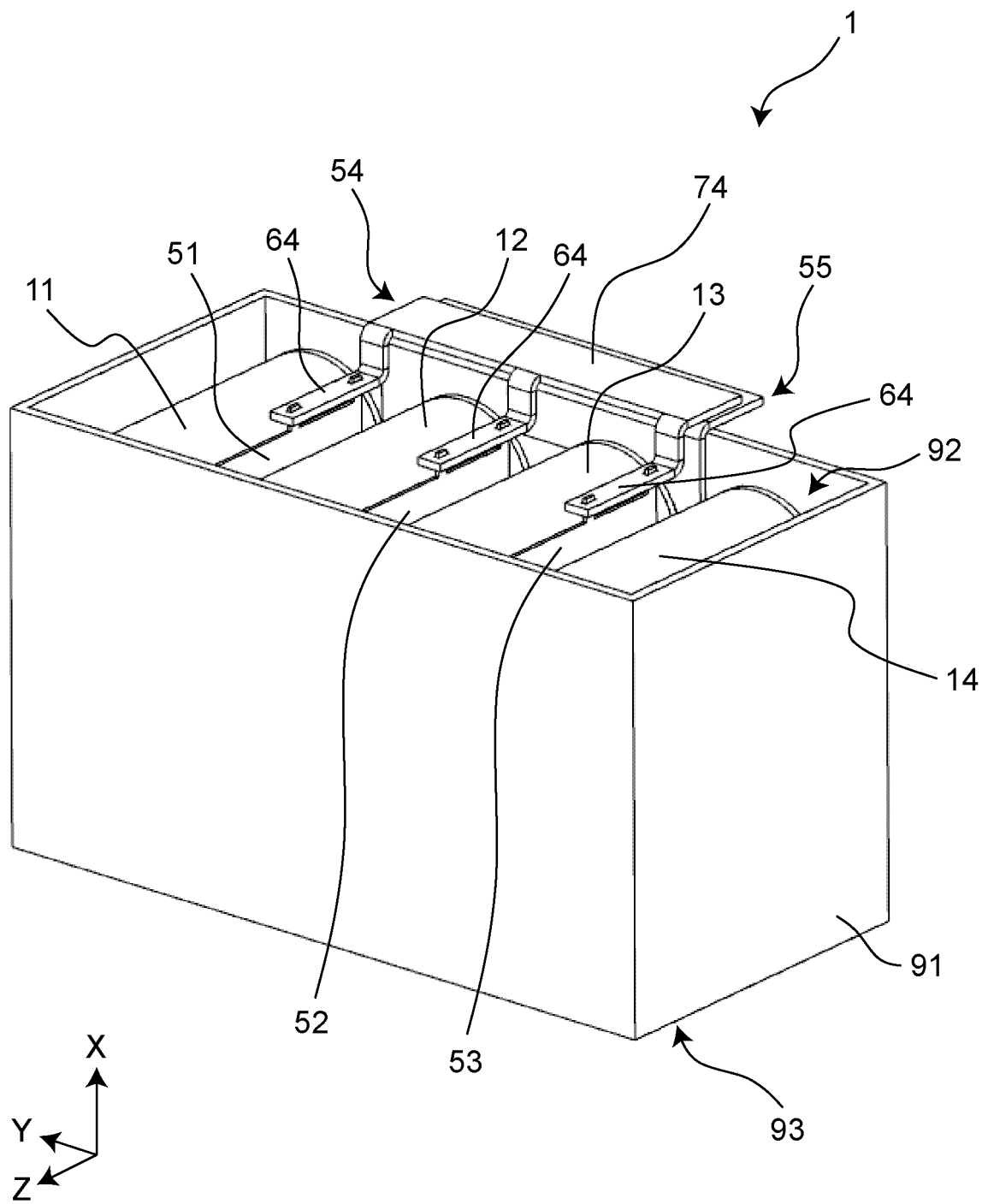
FIG. 1 is a perspective view showing a capacitor module according to a first embodiment of the present invention.

In the capacitor described in Patent Document 1, the unit capacitors each have a capacitor element and an element electrode plate, each element electrode plate being connected to one electrode of each capacitor element. Each element electrode plate is arranged adjacent to each capacitor so that heat generated from the capacitor element can be dissipated by the element electrode plate.

On the other hand, due to the configuration connecting one element electrode plate to one capacitor element, the number of the element electrode plates may be excessive depending on the arrangement of the capacitor elements. When the number of the element electrode plates is excessive, there are problems that the configuration becomes cumbersome and that the assembly process becomes complicated.

Thus, the inventors investigated a capacitor module having a simplified configuration as well as improved heat dissipation and arrived at the following invention.

A capacitor module according to an aspect of the present invention comprises: a plurality of capacitors each including: a first electrode and a second electrode that face each other, and a side surface joining the first electrode and the second electrode, the side surface having a pair of flat portions that face each other, and a pair of curved portions that face each other and join the pair of flat portions to each other, the plurality of capacitors being arrayed in a row such that the flat portions of adjacent capacitors of the plurality of capacitors face each other; at least one metal sheet arranged in any of spaces between the flat portions of the adjacent capacitors, the at least one metal sheet being in contact with the first electrode of at least one of the adjacent capacitors; a first bus-bar electrically connected to the at least one metal sheet; and a second bus-bar electrically connected to each of the second electrodes of the plurality of capacitors.

According to this configuration, the metal sheets arranged between the flat portions can cover all of the first electrodes of the plurality of capacitors. This achieves the simplified configuration while improving heat dissipation by the metal sheets.

The metal sheet may bend in different directions so as to come into contact with the first electrodes of both of the adjacent capacitors.

This configuration allows each metal sheet to come into contact with two first electrodes. This facilitates design changes such as arranging the metal sheet in all of the spaces between the flat portions, or thinning out the number of the metal sheets to be arranged. Since the specifications of the metal sheets can be unified, mass production of the metal sheets becomes possible, enabling suppression of the production costs.

The metal sheet may comprise a main body arranged between the respective flat portions of the adjacent capacitors; one or more first electrode contact portions extending from the main body and contacting the first electrode of one capacitor of the adjacent capacitors; one or more second electrode contact portions extending from the main body and contacting the first electrode of a second capacitor of the adjacent capacitors, wherein the one or more first electrode contact portions and the one or more second electrode contact portions are alternately disposed at intervals; and a bus-bar contact portion extending from the main body and contacting the first bus-bar.

This configuration ensures well-balanced arrangement of the electrode contact portions.

The bus-bar contact portion may be located at a position up to which the main body extends from between the respective flat portions of the adjacent capacitors toward between the respective curved portions of the adjacent capacitors.

According to this configuration, as compared with the case where the bus-bar contact portion is disposed at a position extended toward the second electrode, the distance between the bus-bar contact portion and the second electrode can be increased. Short circuit between the bus-bar contact portion and the second electrode can thus be prevented.

The bus-bar contact portion may lie between the curved portions.

This configuration enables the bus-bar contact portion to be arranged in a dead space between the curved portions. This contributes to size reduction of the capacitor module.

The number of the plurality of capacitors may be 2n+1 (n is a natural number), and the number of the metal sheets may be n+1 to 2n.

According to this configuration, each of the first electrodes can be connected to the metal sheet arranged between the adjacent capacitors with a smaller number of metal sheets than the number of the capacitors. This achieves simplification of the configuration and suppression of the production costs.

The number of the plurality of capacitors may be 2n (n is a natural number greater than or equal to 2), and the number of the metal sheets may be n to 2n−1.

According to this configuration, each of the first electrodes can be connected to the metal sheet arranged between the adjacent capacitors with a smaller number of metal sheets than the number of the capacitors. This achieves simplification of the configuration and suppression of the production costs.

The number of the plurality of capacitors may be m (m is a natural number greater than or equal to 3), and the number of the metal sheets may be m−1.

This configuration enables the metal sheet to be arranged in all of the spaces between the flat portions. This can improve heat dissipation of the capacitor module.

A first embodiment according to the present invention will hereinafter be described with reference to the accompanying drawings. In the drawings, elements are shown in an exaggerated manner for ease of explanation.

First Embodiment

[Overall Configuration]

Figure 2:
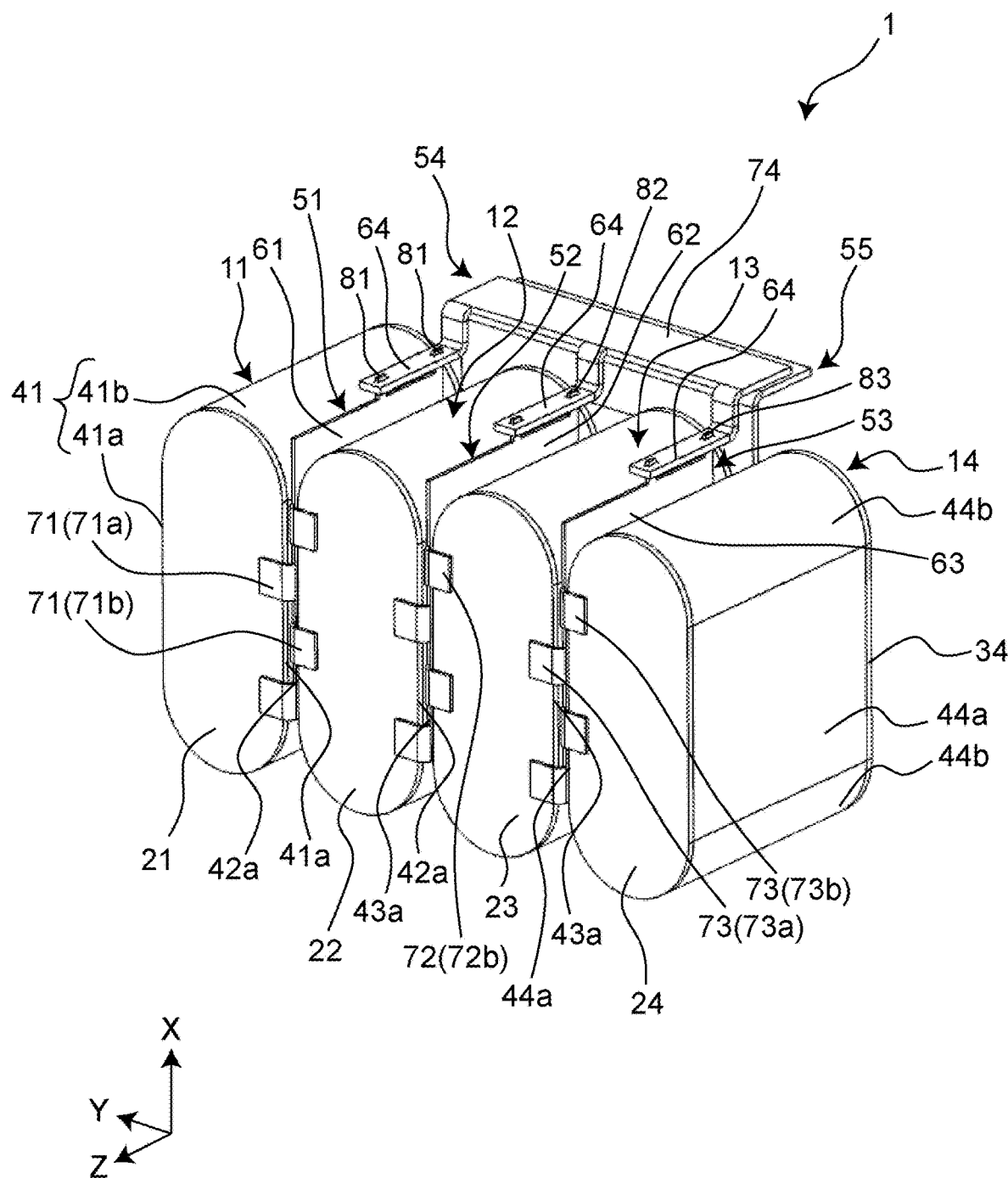
FIG. 2 is a perspective view of the capacitor module of FIG. 1, with a case removed.
Figure 3A:
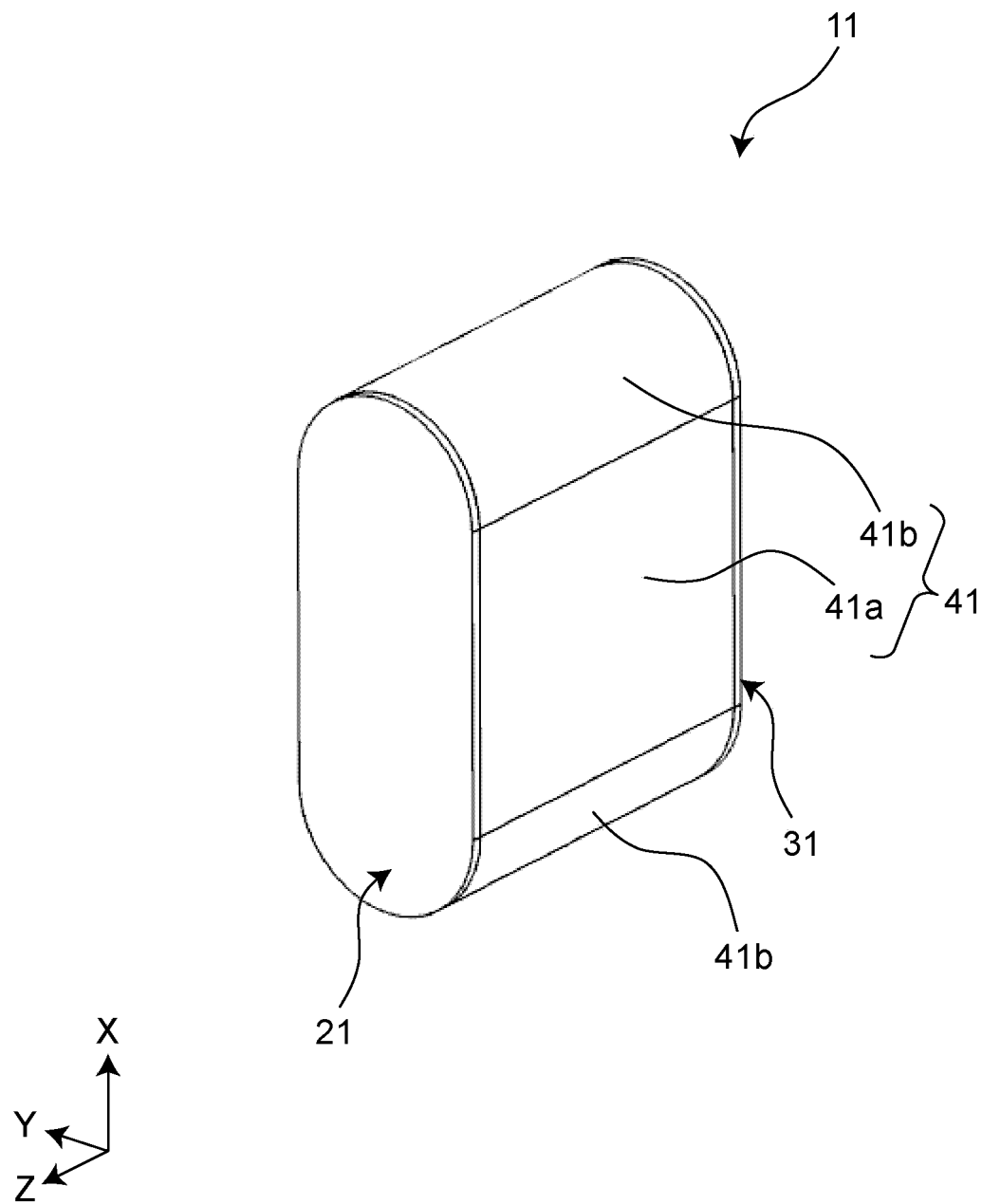
FIG. 3A is a perspective view showing a capacitor of the capacitor module of FIG. 1.
Figure 3B:
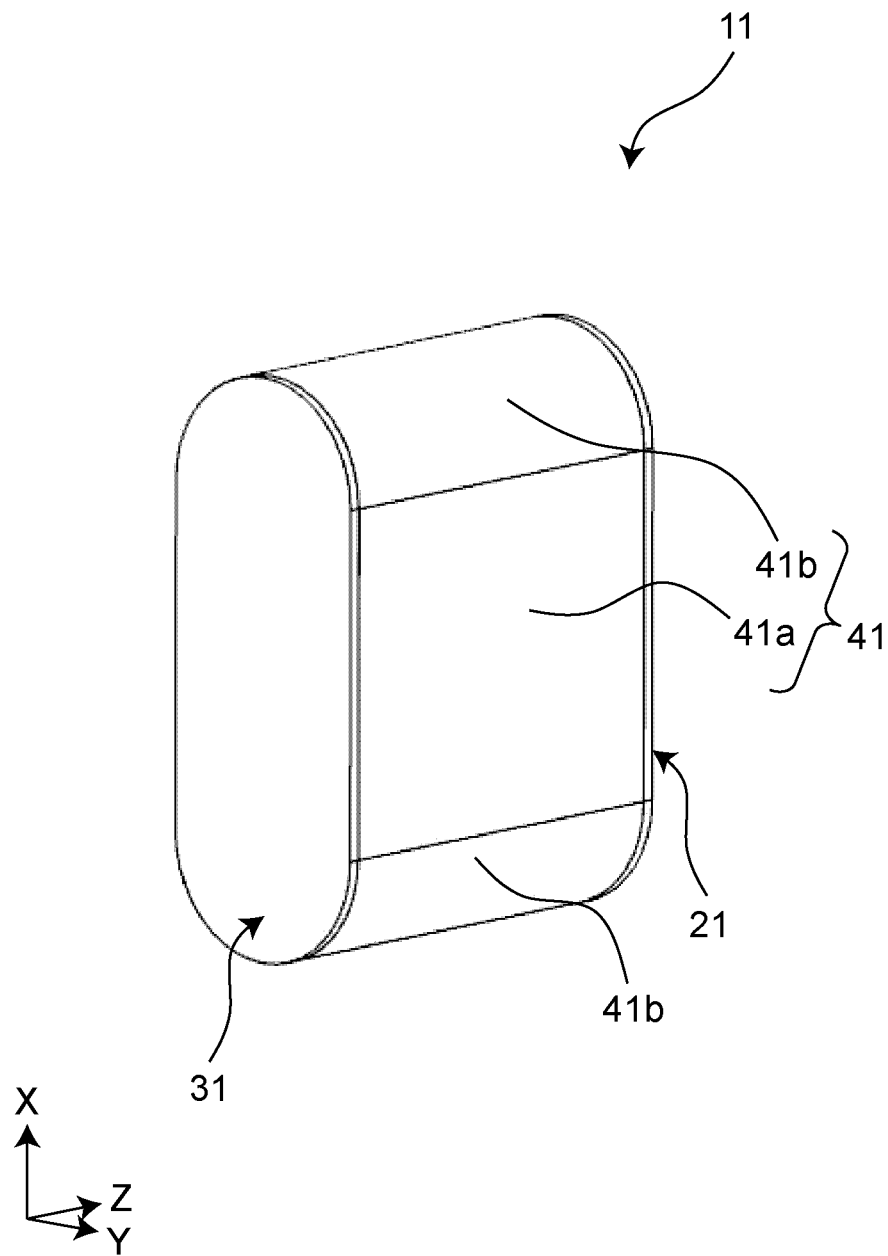
FIG. 3B is a perspective view showing a capacitor of the capacitor module of FIG. 1.
Figure 4:
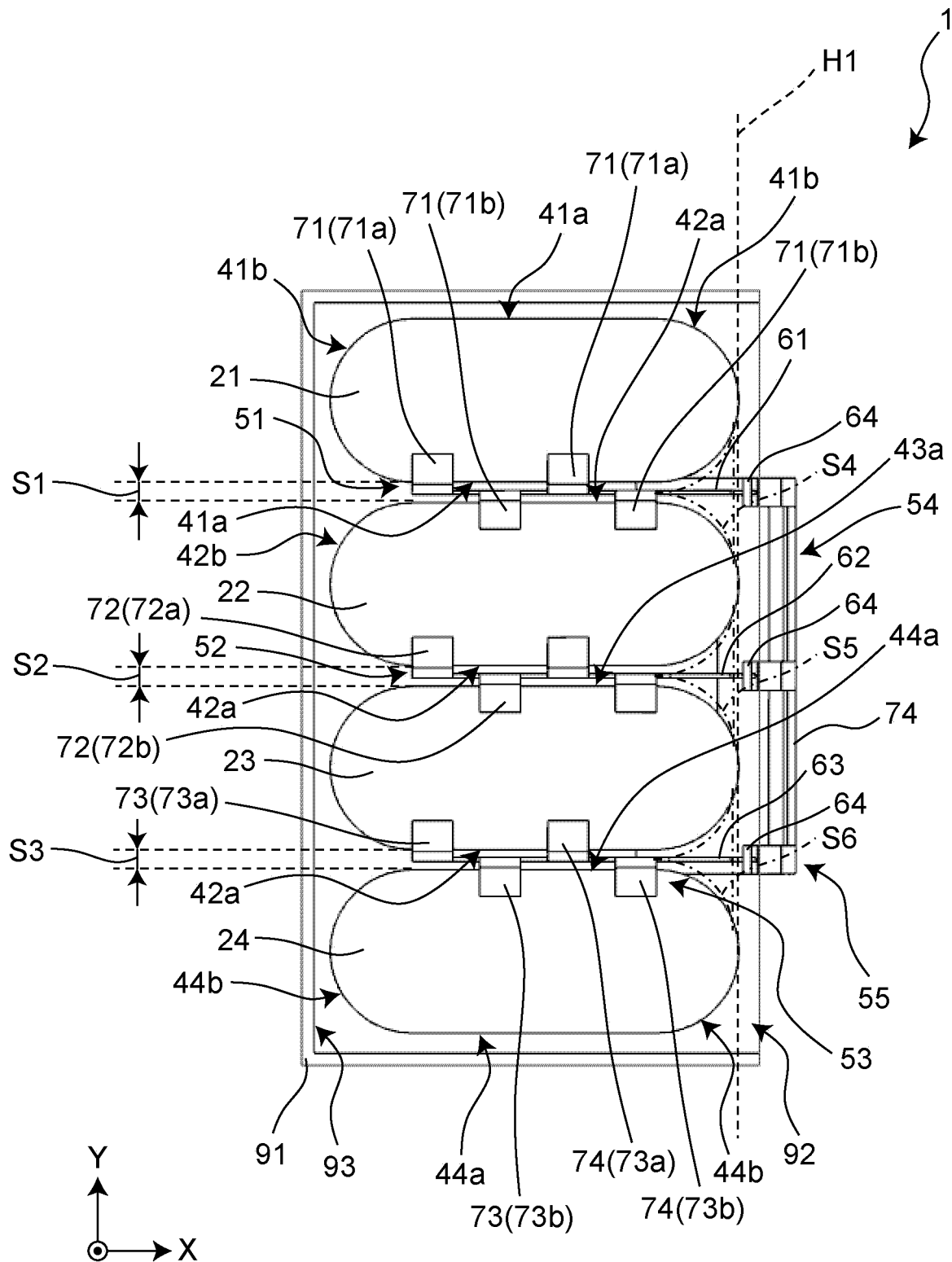
FIG. 4 is a side view of the capacitor module of FIG. 1.
Figure 5:
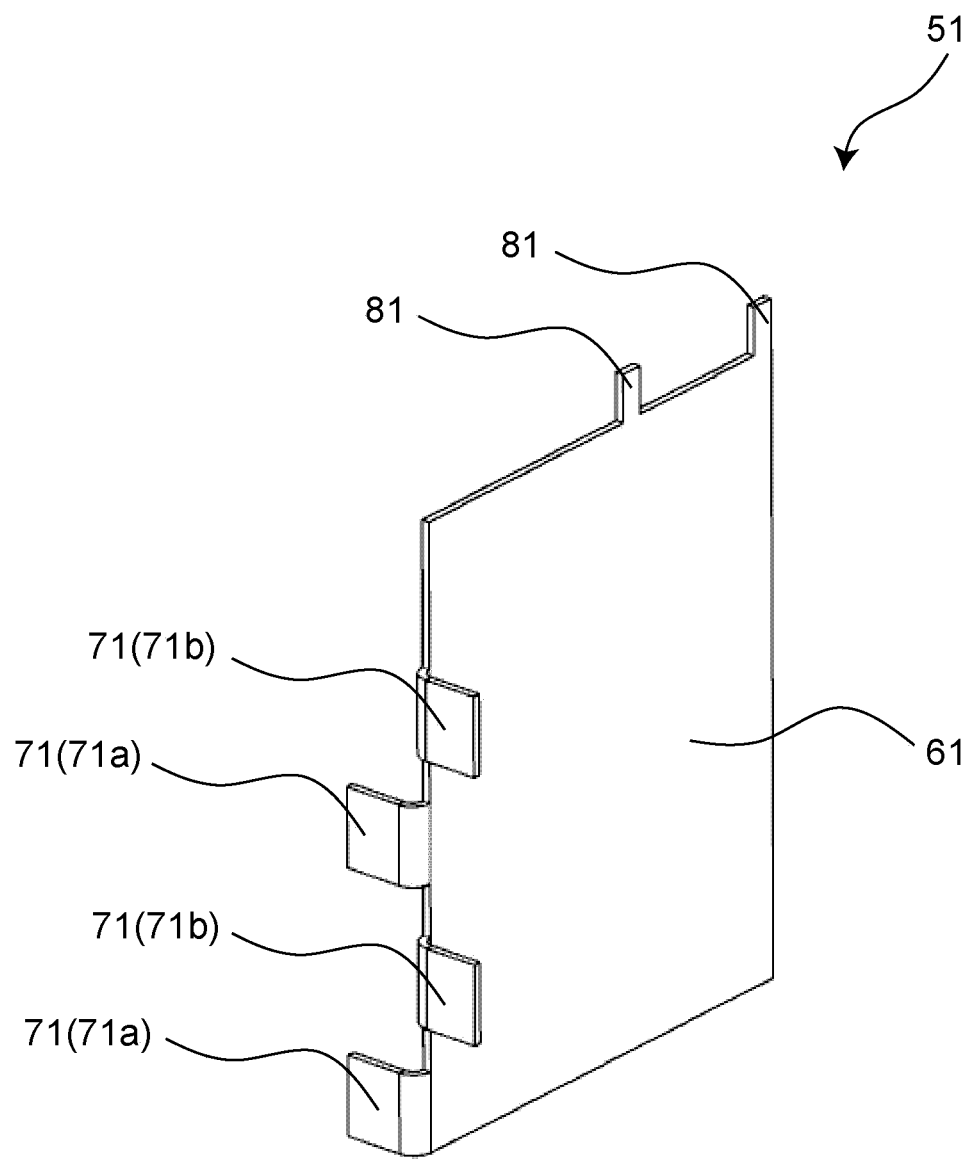
FIG. 5 is a perspective view showing a metal sheet of the capacitor module of FIG. 1.
Figure 6:
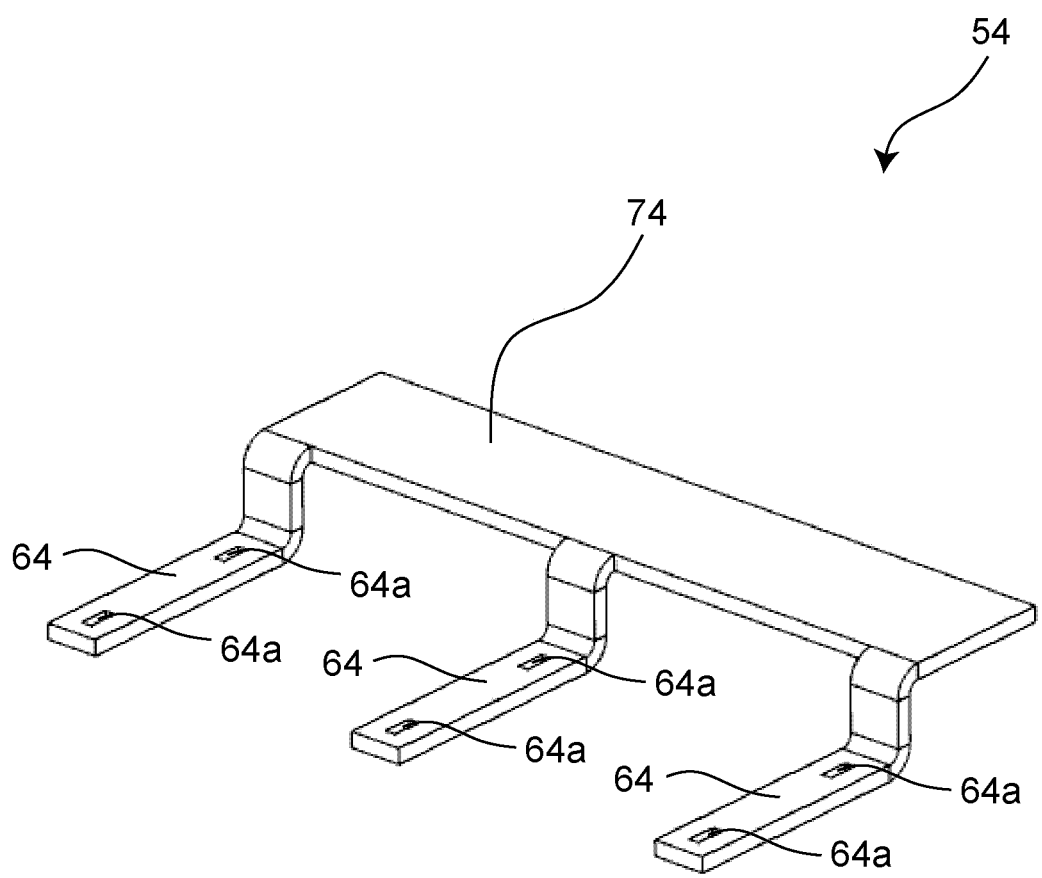
FIG. 6 is a perspective view showing a first bus-bar of the capacitor module of FIG. 1.
Figure 7:
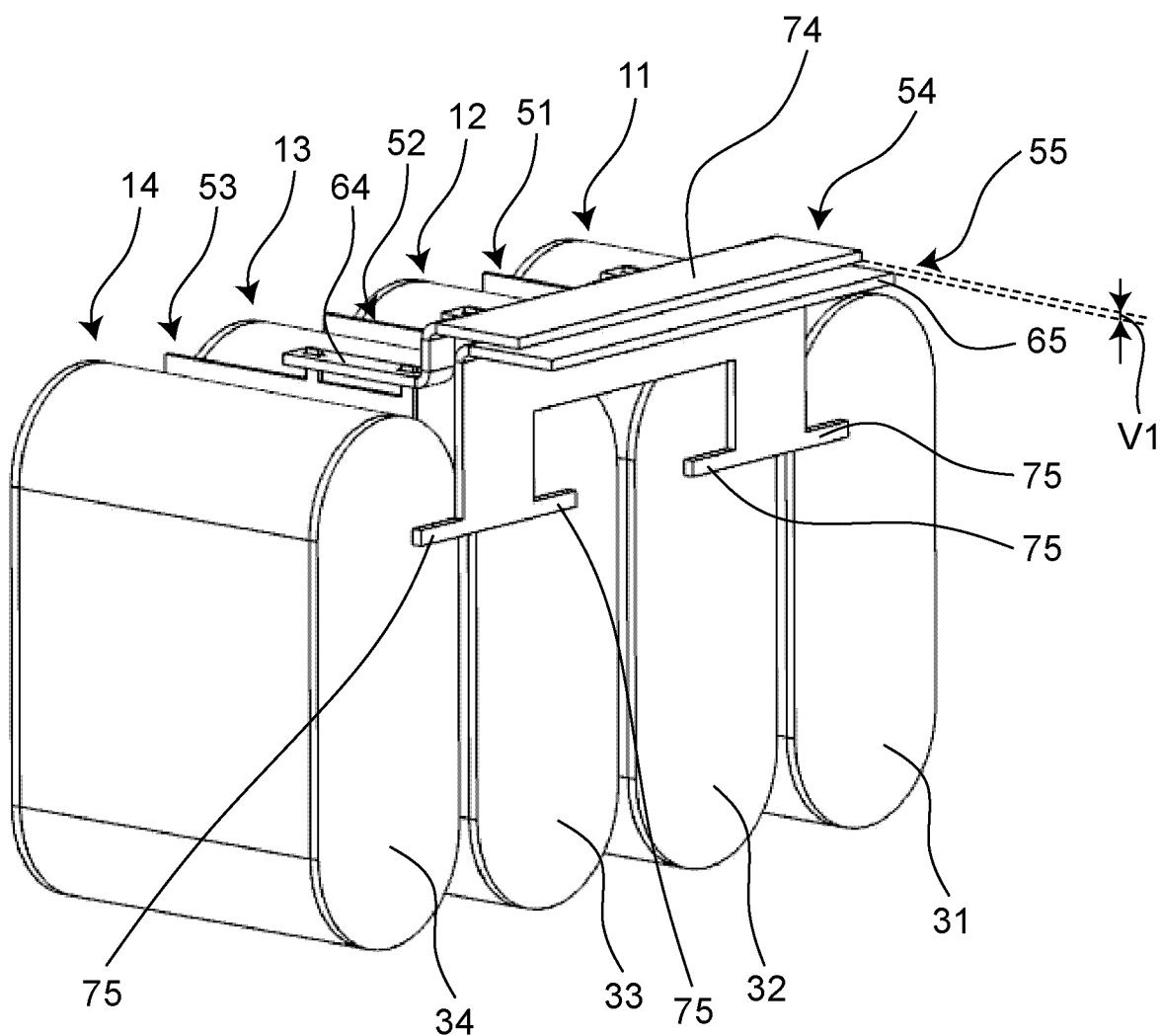
FIG. 7 is a perspective view of the capacitor module of FIG. 1, seen from a different direction.

FIG. 1 is a perspective view showing a capacitor module 1 according to the first embodiment of the present invention. FIG. 2 is a perspective view of the capacitor module 1 of FIG. 1, with a case 91 removed. FIGS. 3A and 3B are perspective views showing a capacitor 11 of the capacitor module of FIG. 1. FIG. 4 is a side view of the capacitor module 1 of FIG. 1. FIG. 5 is a perspective view showing a metal sheet 51 of the capacitor module 1 of FIG. 1. FIG. 6 is a perspective view showing a first bus-bar 54 of the capacitor module 1 of FIG. 1. FIG. 7 is a perspective view of the capacitor module 1 of FIG. 1, seen from a different direction. X, Y, and Z directions in the diagrams represent height, lateral, and longitudinal directions, respectively, of the capacitor module 1.

The capacitor module 1 comprises, as shown in FIGS. 1 and 2, four capacitors 11 to 14, three metal sheets 51 to 53, the first bus-bar 54, and a second bus-bar 55. In the capacitor module 1, the case 91 made of resin houses the four capacitors 11 to 14, the metal sheets 51 to 53, a part of the first bus-bar 54, and a part of the second bus-bar 55, with the interior of the case 91 being filled with sealing resin (not shown).

The case 91 has an opening 92 provided at a position facing a bottom surface 93. The case 91 is made of an insulating material, for example, a synthetic resin such as polyphenylene sulfide (PPS resin) or polybutylene terephthalate (PBT resin).

The sealing resin is filled in the interior of the case 91 to seal constituent elements of the capacitor module 1. The sealing resin is a thermosetting resin, and, for example, can be an epoxy resin. It may be a urethane resin.

<Capacitors>

The capacitors 11 to 14 are film capacitors formed by winding a dielectric film. The capacitors 11 to 14 are formed by winding the dielectric film on which surface a metal deposition film is formed and pressing a roll of the dielectric film into a flat shape. In this embodiment, the four capacitors 11 to 14 are included in the capacitor module 1. The capacitors 11 to 14 have a similar configuration, and therefore the capacitor 11 will be described herein.

The capacitor 11 has, as shown in FIGS. 3A and 3B, a first electrode 21, a second electrode 31, and a side surface 41. The first electrode 21 and the second electrode 31 are (end face) electrodes arranged so as to face each other. The side surface 41 is a side surface joining the first electrode 21 and the second electrode 31. The side surface 41 has a pair of flat portions 41a facing each other and a pair of curved portions 41b joining the pair of flat portions 41a together.

The dielectric film of the capacitor 11 can be, for example, a plastic film such as polyethylene terephthalate, polypropylene, polyphenylene sulfide, or polyethylene naphthalate. The metal deposition film formed on the surface of the plastic film can be Al, Zn, or the like. The first electrode 21 and the second electrode 31 are formed, for example, by thermal spraying Zn or the like at the ends of the wound dielectric film.

As shown in FIGS. 2 and 4, the capacitors 11 to 14 are arrayed in a row inside the case 91 such that the flat portions 41a to 44a face each other. That is, the flat portion 41a and the flat portion 42a face each other, the flat portion 42a and the flat portion 43a face each other, the flat portion 43a and the flat portion 44a face each other. The capacitors 11 to 14 are arrayed such that a gap distance between the flat portions 41a to 44a is approx. 0.5 mm to 4.0 mm. The capacitors 11 to 14 are arranged such that, among the curved portions 41b to 44b, the curved portions 41b to 44b on one hand face the opening 92, while the curved portions 41b to 44b on the other face the bottom surface 93.

<Metal Sheet>

As shown in the figures, the metal sheets 51 to 53 are conductive members that electrically connect the first electrodes 21, 22, 23, and 24 of the capacitors 11, 12, 13 and 14, respectively, and the first bus-bar 54. As shown in the figures, the metal sheets 51, 52, and 53 have, respectively, main bodies 61, 62, and 63, electrode contact portions 71 (71a/71b), 72 (72a/72b), and 73 (73a/73b), and bus-bar contact portions 81, 82, and 83.

As shown in FIGS. 2 and 4, the metal sheets 51 to 53 are arranged such that the main bodies 61 to 63 lie in spaces between the flat portions 41a to 44a of the capacitors 11 to 14. That is, the metal sheets 51 to 53 are arranged respectively between the respective flat portions 41a and 42a of the adjacent capacitors 11 and 12, between the respective flat portions 42a and 43a of the adjacent capacitors 12 and 13, and between the respective flat portions 43a and 44a of the adjacent capacitors 13 and 14. In this embodiment, the main body 61 of the metal sheet 51 is arranged in a space S1 between the flat portion 41a and the flat portion 42a. Similarly, the main body 62 of the metal sheet 52 is arranged in a space S2 between the flat portion 42a and the flat portion 43a. Furthermore, the main body 63 of the metal sheet 53 is arranged in a space S3 between the flat portion 43a and the flat portion 44a. That is, in the capacitor module 1, the three metal sheets 51 to 53 are arranged for the four capacitors 11 to 14.

Since the metal sheets 51 to 53 have a similar configuration, the configuration of the metal sheet 51 will be described with reference to FIG. 5.

The main body 61 of the metal sheet 51 is a portion arranged in the space S1 between the flat portion 41a and the flat portion 42a. When sealing resin is filled in the interior of the case 91, with the main body 61 of the metal sheet 51 arranged in the space S1, the sealing resin is filled in the space S1 as well. At this time, the sealing resin enters between the main body 61 and the flat portion 41a and between the main body 61 and the flat portion 42a, leading to improvement in thermal conductivity.

The metal sheet 51 includes the electrode contact portions 71 extending from the main body 61 to contact the first electrodes 21 and 22. The electrode contact portions 71 are configured by bending a part of an end in the longitudinal direction (Z direction) of the main body 61 in the lateral direction (Y direction). This embodiment includes, as shown in FIG. 5, four electrode contact portions 71 (two electrode contact portions 71a and two electrode contact portions 71b). The electrode contact portions 71a are bent to contact the first electrode 21 of the capacitor 11 from the main body 61. The electrode contact portions 71b are bent to contact the first electrode 22 of the capacitor 12 from the main body 61. That is, the electrode contact portions 71a and the electrode contact portions 71b bend in different directions so that the metal sheet 51 comes into contact with both the first electrodes 21 and 22 of the two capacitors 11 and 12.

In this embodiment, the electrode contact portions (first electrode contact portions) 71a contacting the first electrode 21 of the capacitor 11 and the electrode contact portions (second electrode contact portions) 71b contacting the first electrode 22 of the capacitor 12 are alternately disposed spaced apart in the height direction (X direction). Alternate disposition of the electrode contact portions 71a and the electrode contact portions 71b ensures well-balanced arrangement of the electrode contact portions 71. It also enables the electrode contact portions 71a and the electrode contact portions 71b to come into even contact with the first electrode 21 and the first electrode 22. The arrangement of the electrode contact portions 71a and the electrode contact portions 71b is not limited thereto as long as the configuration allows connections to both the first electrode 21 of the capacitor 11 and the first electrode 22 of the capacitor 12.

The electrode contact portions 71 are electrically connected to the first electrodes 21 and 22 by soldering. Not all electrode contact portions 71 need to be soldered. For example, one of the two electrode contact portions 71a and one of the two electrode contact portions 71b may be soldered, and the remainders may be brought into mere contact with the first electrodes 21 and 22, respectively, without soldering. By appropriately selecting the electrode contact portions 71 to be soldered, it is possible to reduce the influence of heat during soldering on the characteristics of the capacitor module 1. By soldering all of the electrode contact portions 71 to the first electrodes 21 and 22, it is possible to improve the reliability in connection between the metal sheet 51 and the first electrodes 21 and 22.

The metal sheet 51 includes, as shown in FIGS. 2 and 5, the bus-bar contact portions 81 extending from the main body 61 to contact the first bus-bar 54. The bus-bar contact portions 81 are portions inserted into holes 64a (see FIG. 6) disposed at an embedded portion 64 of the first bus-bar 54 that will be described later. The bus-bar contact portions 81 are configured as protruding portions that further protrude in X direction from a part of an end in X direction of the main body 61.

In this embodiment, as shown in FIG. 4, the bus-bar contact portions 81 are provided at a position up to which the main body 61 extends from the space S1 between the flat portions 41a and 42a toward a space S4 between the curved portions 41b and 42b. That is, the bus-bar contact portions 81 are provided at a position up to which the main body 61 extends from between the respective flat portions 41a and 42a of the adjacent capacitors 11 and 12 toward between the respective curved portions 41b and 42b of the capacitors 11 and 12. Similarly, the bus-bar contact portions 82 are provided at a position up to which the main body 63 extends from the space S2 toward a space S5, and the bus-bar contact portions 83 are provided at a position up to which the main body 63 extends from the space S3 toward a space S6. The bus-bar contact portions 81 to 83 are electrically connected to the first bus-bar 54 by soldering.

The metal sheets 51 to 53 can be formed by, for example, pressing a metal sheet of approx. 0.3 mm to 0.5 mm in thickness. The metal sheets 51 to 53 are made of a thinner metal than the first bus-bar 54 that will be described later. Since they are made of a low-cost metal thinner than the first bus-bar 54, the production costs can be reduced by connecting the first electrodes 21 to 24 of the capacitors 11 to 14 via the metal sheets 51 to 53 to the first bus-bar 54.

Since the four capacitors 11 to 14 are arrayed in a row, the three spaces S1 to S3 are provided between the flat portions. In the embodiment, as shown in FIG. 4, the metal sheets 51 to 53 are arranged in the three spaces S1 to S3, respectively. Due to the arrangement of the metal sheets 51 to 53 in the three respective spaces S1 to S3, the capacitor module 1 can have improved heat dissipation. Such an arrangement of the metal sheets 51 to 53 enables the first electrodes 21 to 24 of the capacitors 11 to 14 to be connected to the first bus-bar 54 by using a less number of the metal sheets 51 to 53 than the number of the capacitors 11 to 14, leading to a simplified configuration of the capacitor module 1. By arranging the metal sheets 51 to 53 in the spaces S1 to S3, respectively, currents flowing through the metal sheets 51 to 53 can efficiently cancel magnetic fields caused by currents flowing through the capacitors 11 to 14, allowing the capacitor module 1 to have a low ESL.

Sealing resin is filled in the spaces S1 to S3 between the flat portions. Heat generated from the capacitors 11 to 14 is transmitted through the sealing resin to the metal sheets 51 to 53. Since the metal sheets 51 to 53 are electrically and mechanically connected to the first bus-bar 54, heat of the capacitors 11 to 14 can be efficiently radiated to the outside of the capacitor module 1 from an exposed portion 74 of the first bus-bar 54 that is exposed to the outside of the sealing resin.

In this embodiment, as shown in FIG. 2, the metal sheet 51 is in contact with both the first electrodes 21 and 22 of the capacitors 11 and 12, respectively. Similarly, the metal sheet 52 is in contact with both the first electrodes 22 and 23 of the capacitors 12 and 13, respectively, and the metal sheet 53 is in contact with both the first electrodes 23 and 24 of the capacitors 13 and 14, respectively. In other words, the first electrode 21 of the capacitor 11 is in contact with the metal sheet 51, the first electrode 22 of the capacitor 12 is in contact with the metal sheet 51 and the metal sheet 52, the first electrode 23 of the capacitor 13 is in contact with the metal sheet 52 and the metal sheet 53, and the first electrode 24 of the capacitor 14 is in contact with the metal sheet 53. That is, among the capacitors 11 to 14, the capacitor 12 and the capacitor 13 arranged inside are each in contact with two metal sheets, while the capacitor 11 and 14 arranged outside are each in contact with one metal sheet.

In this embodiment, as shown in FIGS. 2 and 4, the three metal sheets 51 to 53 are arranged for the four capacitors 11 to 14. When arraying the capacitors 11 to 14 in a row such that the flat portions 41a to 44a face each other, the number of the spaces S1 to S3 between the flat portions becomes 3. Since in this embodiment the metal sheets 51 to 53 are arranged in the spaces S1 to S3, respectively, the number of the metal sheets becomes 3 if the number of the capacitors is 4. That is, the number of the metal sheets becomes at most one less than the number of the capacitors.

<First Bus Bar>

The first bus-bar 54 is a plate-shaped conductive member electrically connected to the first electrodes 21 to 24 of the capacitors 11 to 14. The first bus-bar 54 is formed from a conductive member of approx. 0.3 mm to 2 mm in thickness. As shown in FIG. 2, the first bus-bar 54 and the first electrodes 21 to 24 are electrically connected via the metal sheets 51 to 53.

As shown in FIGS. 2 and 6, the first bus-bar 54 has the three embedded portions 64 and the exposed portion 74. The embedded portions 64 are portions connected to the bus-bar contact portions 81 to 83 of the metal sheets 51 to 53 and are embedded in the interior of the sealing resin within the case 91. The exposed portion 74 is a portion exposed to the outside of the case 91.

As shown in FIG. 6, each of the embedded portions 64 has the holes 64a. The bus-bar contact portions 81 to 83 of the metal sheets 51 to 53 are inserted into the holes 64a so that the first bus-bar 54 and the metal sheets 51 to 53 are electrically connected by soldering. Connections between the first bus-bar 54 and the metal sheets 51 to 53 are not limited to soldering, and can be done by, for example, welding or a mechanical method such as caulking.

In this embodiment, as shown in FIG. 4, the embedded portions 64 of the first bus-bar 54 are arranged at a higher position than the capacitors 11 to 14 in the height direction (X direction). Specifically, the embedded portions 64 are arranged at a position closer to the opening 92, than a position H1 of the top of the curved portions 41b to 44b of the capacitors 11 to 14 arranged toward the opening 92. By arranging the embedded portions 64 at this position, connections between the first bus-bar 54 and the metal sheets 51 to 53 can be done at a position apart from the second electrodes 31 to 34. This can prevent short circuit between the first bus-bar 54 and the second electrodes 31 to 34.

<Second Bus Bar>

As shown in FIG. 7, the second bus-bar 55 is a plate-shaped conductive member electrically connected to the second electrodes 31 to 34 of the capacitors 11 to 14. The second bus-bar 55 is formed from a conductive member of approx. 0.3 mm to 2 mm in thickness. The second bus-bar 55 has an exposed portion 65 exposed to the outside of the case 91, and an electrode contact portion 75 in contact with the second electrodes 31 to 34. The second bus-bar 55 and the second electrodes 31 to 34 are electrically connected by soldering.

The exposed portion 74 of the first bus-bar 54 and the exposed portion 65 of the second bus-bar 55 are arranged with an interval V1 of approx. 0.5 mm. By reducing the interval V1 between the exposed portion 74 of the first bus-bar 54 and the exposed portion 65 of the second bus-bar 55 to some extent, the capacitor module 1 can implement a low ESL. Accordingly, the exposed portion 74 and the exposed portion 65 are preferably arranged such that the size of the interval V1 becomes approx. 0.5 mm.

Effects

According to the capacitor module 1 of the first embodiment, the following effects can be provided.

The capacitor module 1 comprises the four capacitors 11 to 14, the three metal sheets 51 to 53, the first bus-bar 54, and the second bus-bar 55. The capacitors 11 to 14 have respectively the first electrodes 21 to 24, the second electrodes 31 to 34, and the side surfaces 41 to 44. The first electrodes 21 to 24 and the second electrodes 31 to 34 are respectively arranged so as to face each other. The side surfaces 41 to 44 join the first electrodes 21 to 24 and the second electrodes 31 to 34, and include respectively the pairs of flat portions 41a to 44a, each pair facing each other, and the pair of curved portions 41b to 44b joining respectively the flat portions 41a to 44a on one hand and the flat portions 41a to 44a on the other. The capacitors 11 to 14 are arrayed in a row such that the flat portions 41a to 44a face each other. The metal sheets 51 to 53 are arranged in corresponding ones of the spaces between the flat portions 41a to 44a of the adjacent capacitors 11 to 14 and are respectively in contact with at least the first electrodes 21 to 24 on one hand of the adjacent capacitors 11 to 14. The first bus-bar 54 is electrically connected to the metal sheets 51 to 53. The second bus-bar 55 is electrically connected to each of the second electrodes 31 to 34. The first electrodes 21 to 24 of the capacitors 11 to 14 are each electrically connected to the metal sheets 51 to 53.

Such a configuration enables the metal sheets 51 to 53 arranged (in the spaces S1 to S3) between the flat portions 41a to 44a to cover all of the first electrodes 21 to 24 of the capacitors 11 to 14. This makes it possible to simplify the configuration of the capacitor module 1 while improving heat dissipation of the capacitor module 1 by the metal sheets 51 to 53.

Due to the arrangement of the metal sheets 51 to 53 in the spaces S1 to S3, magnetic fields caused by currents flowing through the interiors of the capacitors 11 to 14 can be efficiently cancelled, allowing the capacitor module 1 to have a low ESL.

The metal sheets 51 to 53 bend in different directions so as to come into contact with the respective first electrodes 21 to 24 of adjacent two capacitors 11 to 14.

Such a configuration allows each of the metal sheets 51 to 53 to come into contact with the first electrodes 21 to 24 of the two capacitors 11 to 14. This facilitates design changes such as arranging the metal sheet in all of the spaces S1 to S3 between the flat portions 41a to 44a, or thinning out the number of the metal sheets to be arranged. By unifying the specifications of the metal sheets 51 to 53, mass production of the metal sheets 51 to 53 becomes possible, enabling the production costs to be suppressed.

The metal sheets 51 to 53 have the main bodies 61 to 63, the electrode contact portions 71 to 73, and the bus-bar contact portions 81 to 83. The main bodies 61 to 63 are arranged between the respective flat portions 41a to 44a of the adjacent capacitors 11 to 14. The electrode contact portions 71 to 73 extend from the main bodies 61 to 63 to contact the first electrodes 21 to 24. The bus-bar contact portions 81 to 83 extend from the main bodies 61 to 63 to contact the first bus-bar 54 and are provided at a position up to which the main bodies 61 to 63 extend from (the spaces S1 to S3) between the flat portions 41a to 44a toward (the spaces S4 to S6) between the curved portions 41b to 44b.

Such a configuration enables connections between the first bus-bar 54 and the metal sheets 51 to 53 to be performed at a position apart from the second electrodes 31 to 34. This can prevent short circuit between the first bus-bar 54 and the second electrodes 31 to 34.

The number of the capacitors 11 to 14 is m (m is a natural number greater than or equal to 3), and the number of the metal sheets 51 to 53 is m-1. In this embodiment, the number of the capacitors 11 to 14 is 4, and the number of the metal sheets 51 to 53 is 3.

By virtue of such a configuration, the metal sheets 51 to 53 can be arranged in the spaces S1 to S3, respectively, between the flat portions 41a to 44a. This can improve heat dissipation of the capacitor module 1 while simplifying the configuration.

[Variants]

Although in the first embodiment, the example including the four capacitors 11 to 14 has been described, the number of the capacitors is not limited to 4, but 3 or more capacitors can be disposed.

Although in the first embodiment, as shown in FIG. 4, the example has been described where the embedded portions 64 of the first bus-bar 54 are arranged at the same position in the height direction (X direction), this is not limitative. The three embedded portions 64 of the first bus-bar 54 need not necessarily be arranged at the same position in the height direction (X direction). Also in cases where the positions in the height direction differ, the same effects as in the first embodiment can be provided.

Figure 8:
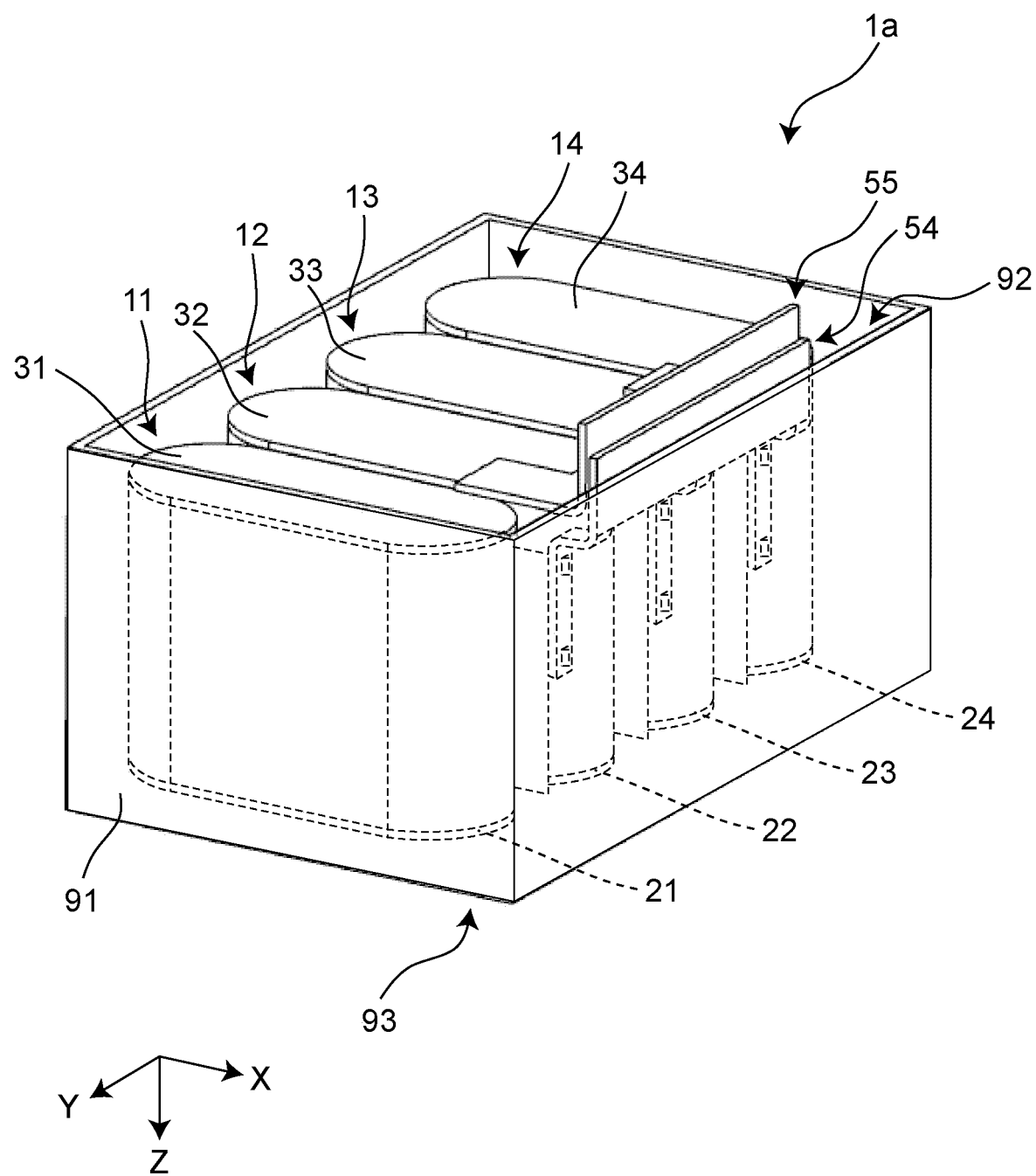
FIG. 8 is a perspective view of a capacitor module according to a first variant of the first embodiment.

Although in the first embodiment, the example has been described where the pairs of curved portions 41b to 44b of the capacitors 11 to 14 are arranged such that each pair face the opening 92 and the bottom surface 93, respectively, of the case 91, the arrangement of the capacitors 11 to 14 is not limited thereto. FIG. 8 is a perspective view of a capacitor module 1a according to a first variant of the first embodiment. As shown in FIG. 8, the capacitors 11 to 14 may be arranged such that the first electrodes 21 to 24 are arranged toward the bottom surface 93 while the second electrodes 31 to 34 are arranged toward the opening 92.

Such a configuration can provide the same effects as in the first embodiment.

Figure 9:
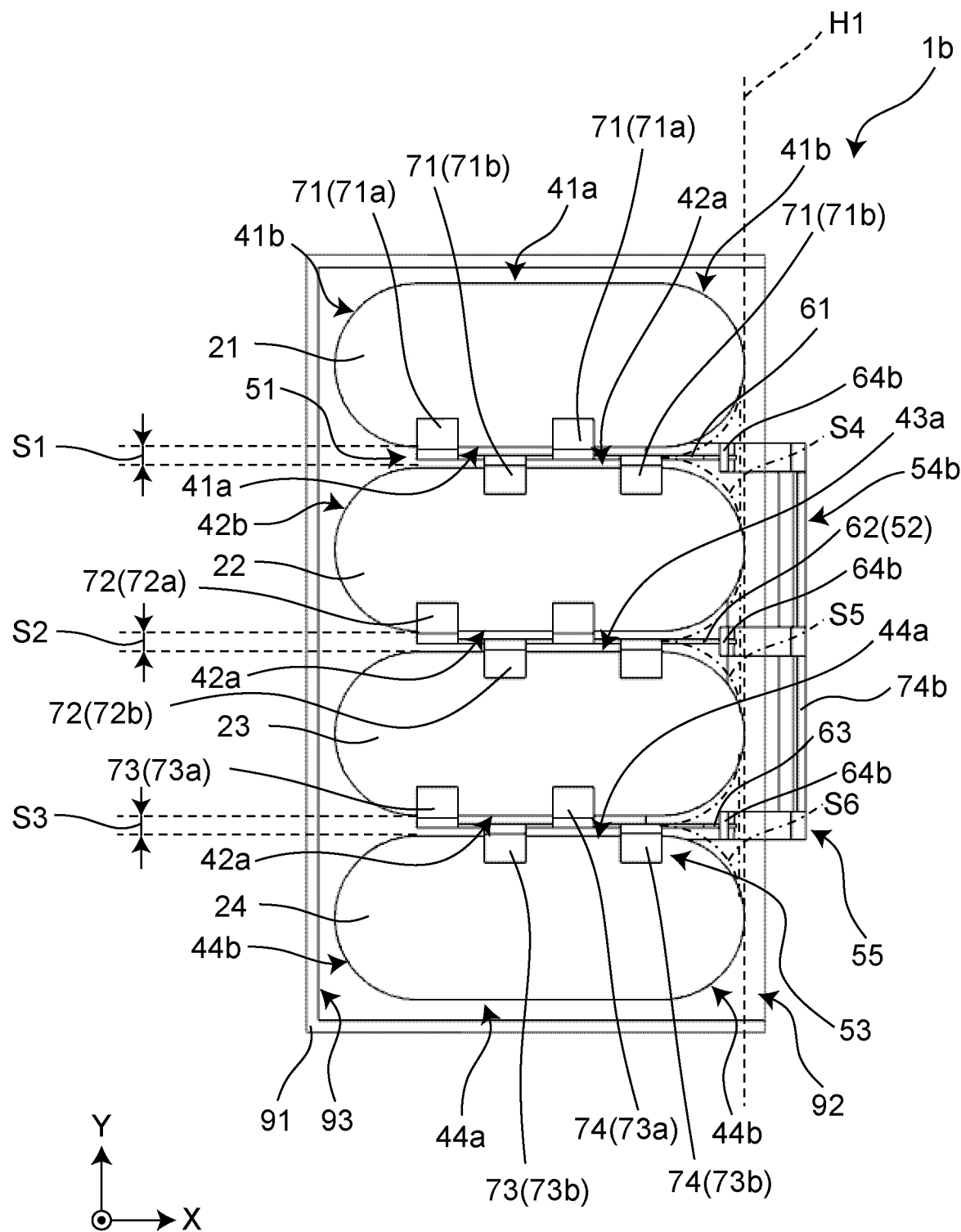
FIG. 9 is a side view of a capacitor module according to a second variant of the first embodiment.

Although in the first embodiment, as shown in FIG. 4, the example has been described where the embedded portions 64 of the first bus-bar 54 are arranged at a higher position than the position H1 of the top of the curved portions 41b to 44b of the capacitors 11 to 14 arranged toward the opening 92, this is not limitative. FIG. 9 is a side view of a capacitor module 1b according to a second variant of the first embodiment. As shown in FIG. 9, embedded portions 64b of a first bus-bar 54b may be arranged at a lower position than the position H1 of the top of the curved portions 41b to 44b of the capacitors 11 to 14. That is, the embedded portions 64b of the first bus-bar 54b are arranged respectively in the spaces S4 to S6 between the curved portions 41b to 44b.

Since the spaces S4 to S6 between the curved portions 41b to 44b become dead spaces within the case 91, the dead spaces can be effectively used by positioning the embedded portions 64b at this position. This contributes to size reduction of the capacitor module 1.

Figure 10:
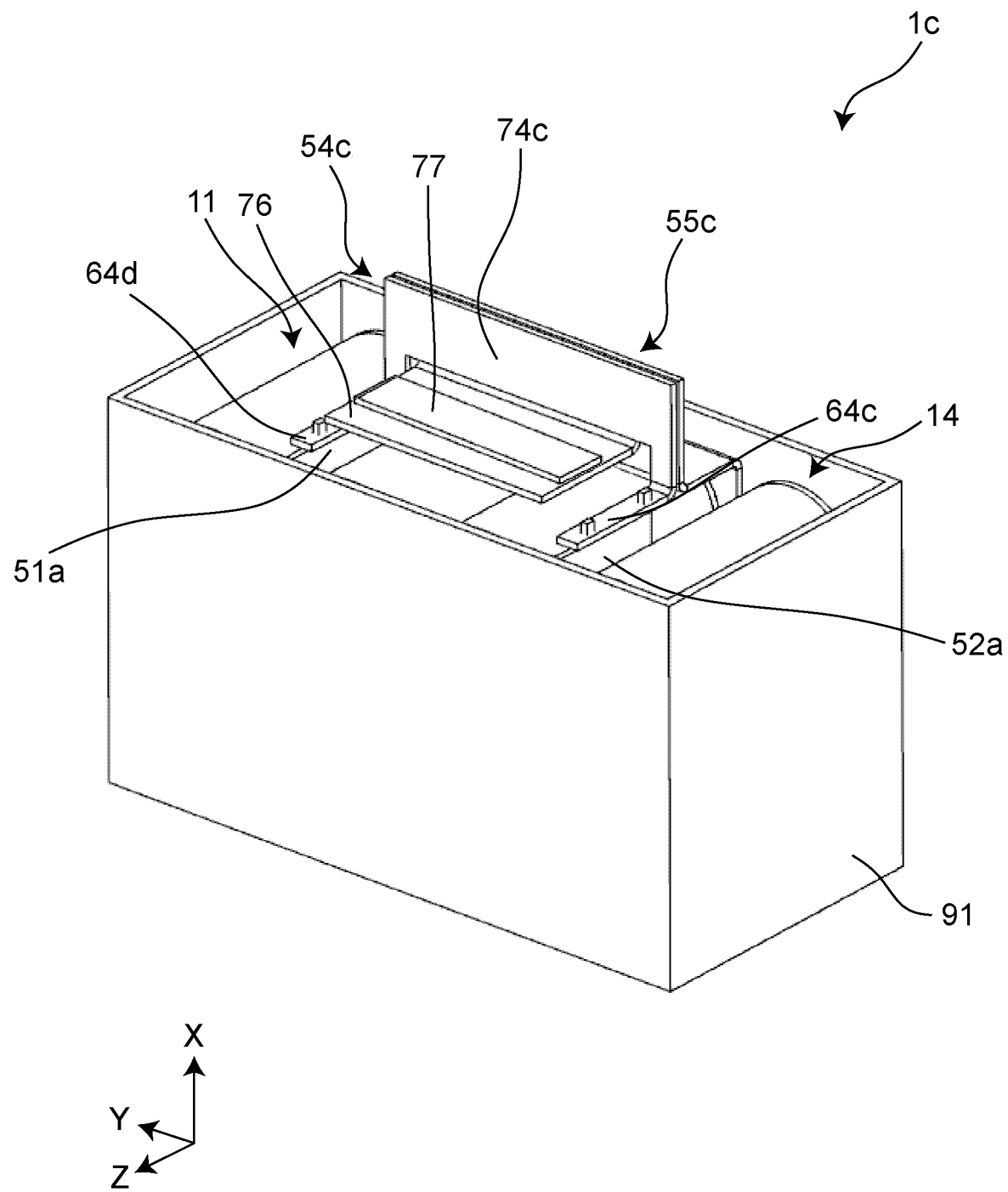
FIG. 10 is a perspective view of a capacitor module according to a third variant of the first embodiment.

The first bus-bar 54 may include a cooling portion on which a thermal pad is arranged. FIG. 10 is a perspective view of a capacitor module 1c according to a third variant of the first embodiment. In the capacitor module 1c, a first bus-bar 54c includes a cooling portion 76 extending from an exposed portion 74c, on which cooling portion 76 a thermal pad 77 is arranged. Due to such a configuration, the first bus-bar 54c can be cooled over a larger area, leading to further improvement in heat dissipation of the capacitor module 1c.

The thermal pad may be arranged on the first bus-bar 54 of the capacitor module 1 of the first embodiment. Specifically, the thermal pad is arranged on the exposed portion 74 of the first bus-bar 54 so that the first bus-bar 54 can be cooled. This achieves further improvement in heat dissipation of the capacitor module 1.

Figure 11:
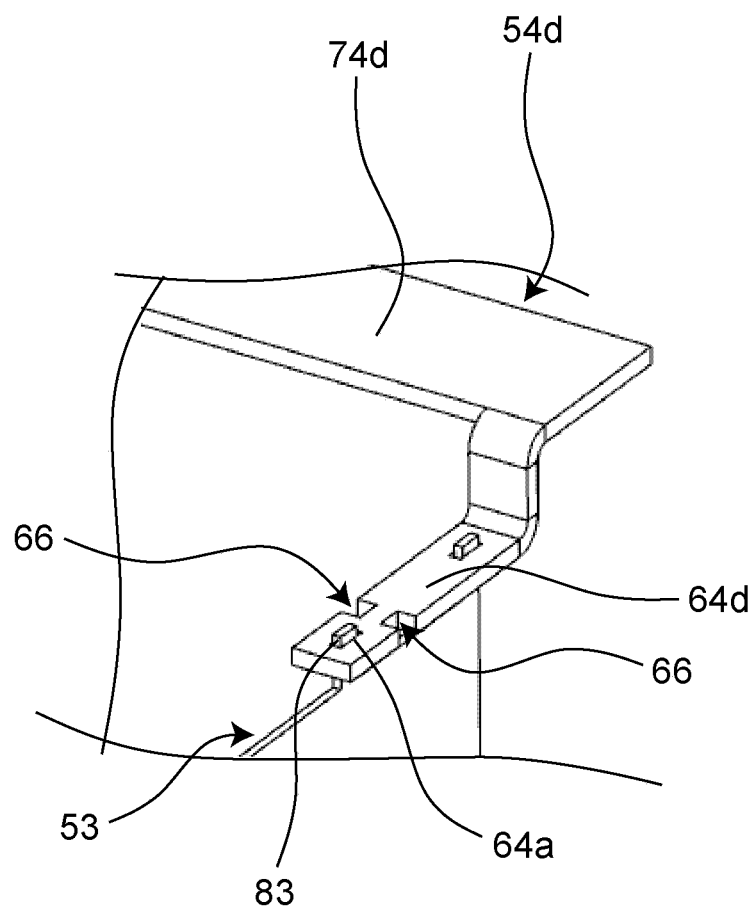
FIG. 11 is an enlarged view of a part of a first bus-bar according to a fourth variant of the first embodiment.

The embedded portions 64c/64d of the first bus-bar may have different shapes. FIG. 11 is an enlarged view of a part of a first bus-bar 54d according to a fourth variant of the first embodiment. As shown in FIG. 11, a recessed portion 66 may be disposed at a part of each of the embedded portions 64d of the first bus-bar 54d that extend from an exposed portion 74d. By disposing the recessed portion 66 in the vicinity of the holes 64a receiving the bus-bar contact portions 83 of the metal sheet 53, escape of heat during soldering can be suppressed.

Second Embodiment

A capacitor module 2 according to a second embodiment of the present invention will be described.

In the second embodiment, difference from the first embodiment will be mainly described. In the second embodiment, constituent elements identical or equivalent to those in the first embodiment will be described with the same reference numerals. In the second embodiment, descriptions overlapping with those in the first embodiment will be omitted.

Figure 12:
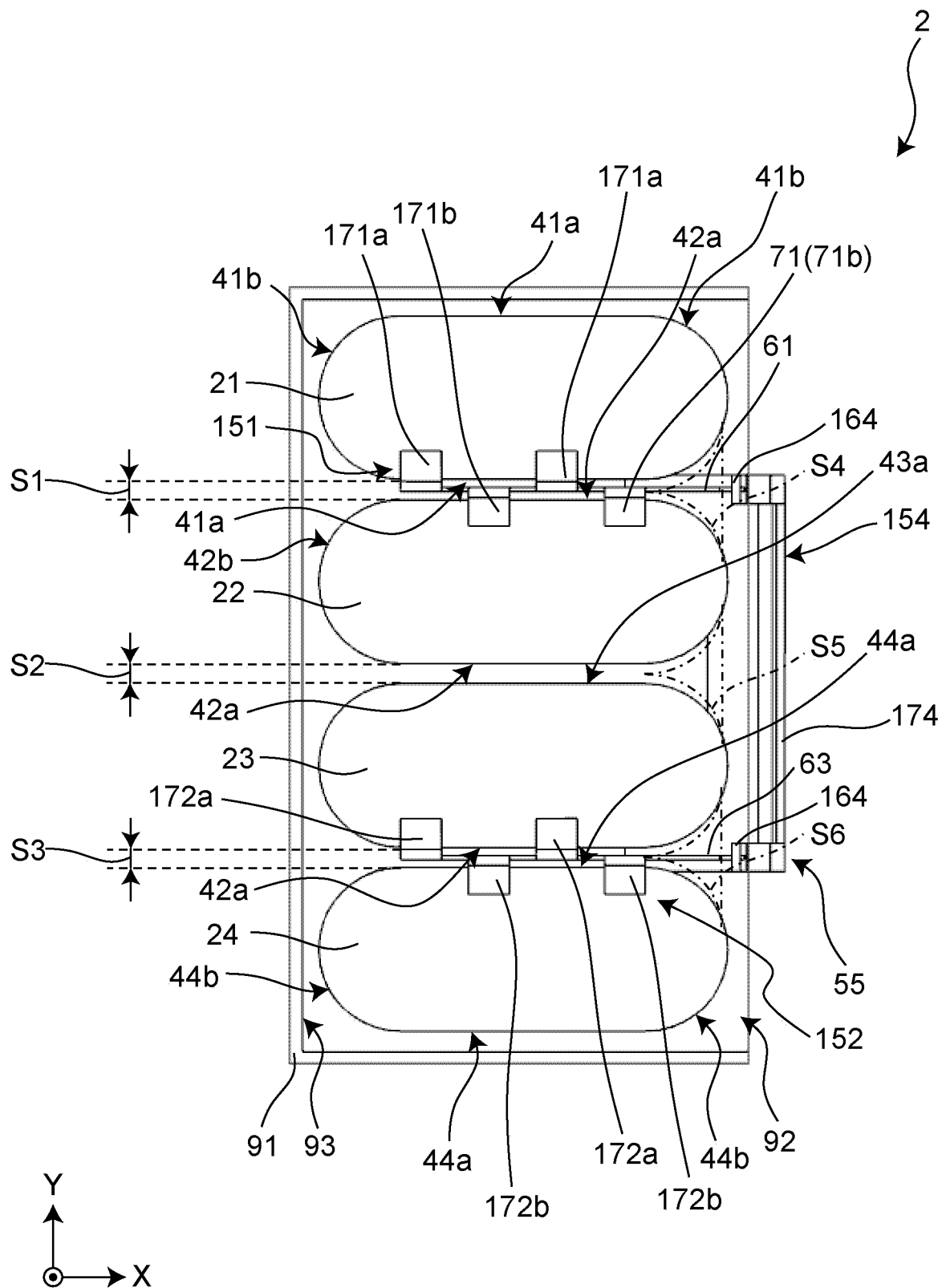
FIG. 12 is a side view of a capacitor module according to a second embodiment.

FIG. 12 is a side view of a capacitor module 2 according to the second embodiment.

In the second embodiment, as shown in FIG. 12, the number of metal sheets 151 and 152 differs from that in the first embodiment. Specifically, among the spaces S1 to S3 between the flat portions, the metal sheet 151 is arranged in the space S1 and the metal sheet 152 is arranged in the space S3. The metal sheets 151 and 152 can be connected respectively to first electrodes of the adjacent two capacitors. For this reason, without arranging the metal sheets in all of the spaces SI to S3, the metal sheets 151 and 152 may be arranged such that the metal sheets 151 and 152 are connected to respective corresponding ones of all the first electrodes 21 to 24. In this embodiment, an electrode contact portion 171a of the metal sheet 151 is connected to the first electrode 21 of the capacitor 11, while an electrode contact portion 171b is connected to the first electrode 22 of the capacitor 12. Similarly, an electrode contact portion 172a of the metal sheet 152 is connected to the first electrode 23 of the capacitor 13, while an electrode contact portion 172b is connected to the first electrode 24 of the capacitor 14. In case of arranging the two metal sheets 151 and 152, a first bus-bar 154 has two embedded portions 164 that extend from exposed portion 174.

Since in this embodiment, the number of the capacitors 11 to 14 is 4, three spaces S1 to S3 are provided between the flat portions. Accordingly, the number of the metal sheets to be arranged can be at most one less than the number of the capacitors. In cases where the number of the capacitors is even, the number of the metal sheets to be arranged can be at least one-half of the number of the capacitors. That is, when the number of capacitors is 2n (n is a natural number greater than or equal to 2), the number of the metal sheets is n to 2n-1. In this embodiment, with n=2, the number of the capacitors is 2n=4 and the number of the metal sheets is n=2.

In cases where the number of the capacitors is odd, i.e., the number of the capacitors is 2n+1 (n is a natural number), the minimum number of the metal sheets is n+1 and the maximum number of the metal sheets is 2n. For example, with n=2, the number of the capacitors is 2n+1=5, while the minimum number of the metal sheets is n+1=3 and the maximum number of the metal sheets is 2n=4.

[Effect]

According to the capacitor module 2 of the second embodiment, the following effect can be presented.

The number of the plurality of capacitors is 2n+1 (n is a natural number) and the number of the metal sheets is n+1 to 2n.

The number of the plurality of capacitors is 2n (n is a natural number greater than or equal to 2) and the number of the metal sheets is n to 2n-1.

Reduction in the number of the metal sheets leads to a simplified configuration of the capacitor module 2.

[Variant]

Figure 13:
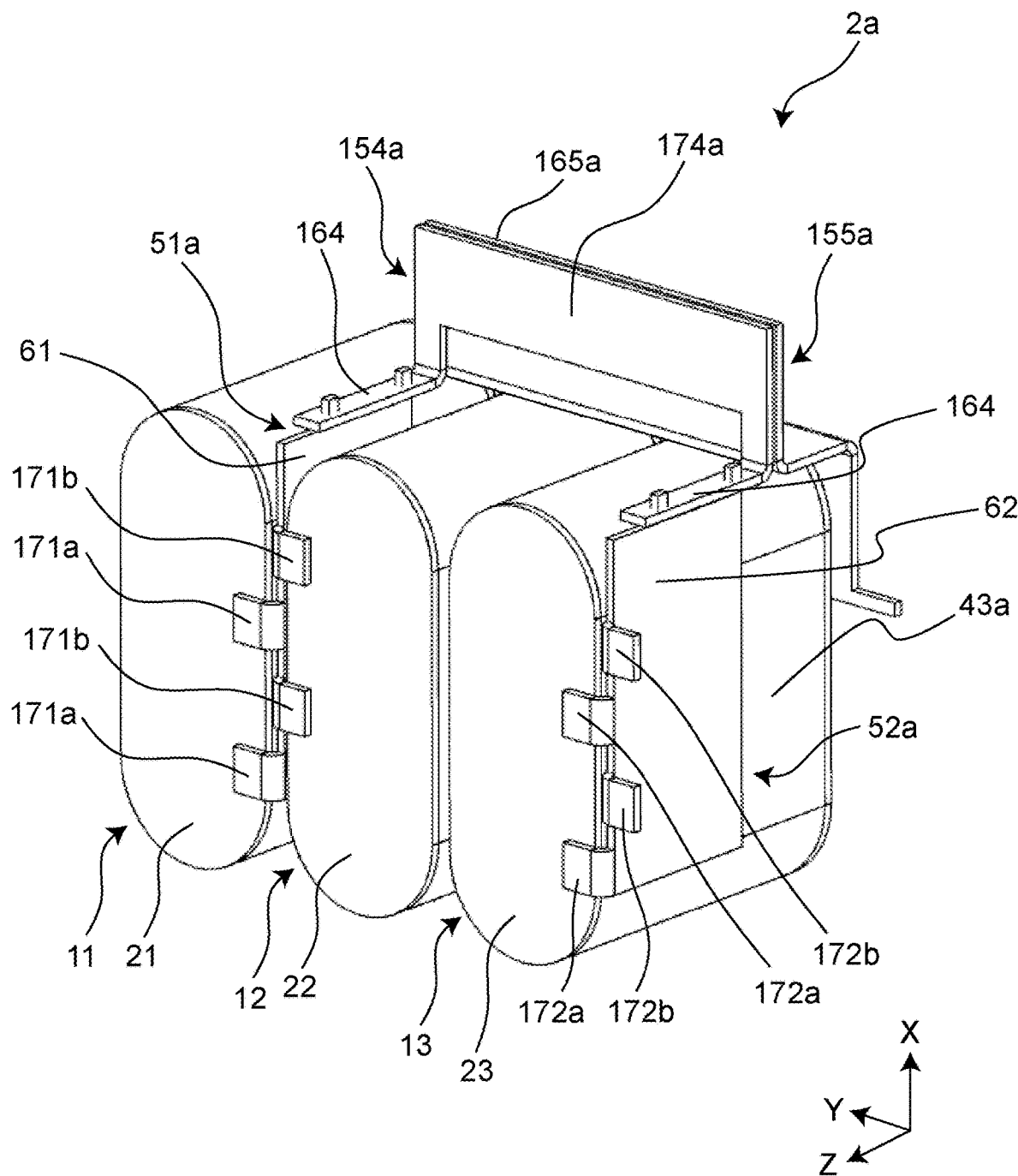
FIG. 13 is a perspective view of a capacitor module according to a variant of the second embodiment.

Although in the second embodiment, the example has been described where the metal sheets 51 to 53 are arranged almost over the entire surfaces of the flat portions 41a to 44a of the capacitors 11 to 14, this is not limitative. FIG. 13 is a perspective view of a capacitor module 2a according to a variant of the second embodiment. In FIG. 13, the case 91 and the capacitor 14 are not shown.

As shown in FIG. 13, metal sheets 51a and 52a are formed to have a length in the longitudinal direction (Z direction) shorter than that of the metal sheets 51 to 53 of the first embodiment. The longitudinal length of the metal sheets 51a and 52a may be a short length of the order of one-half of the longitudinal length of the capacitors 11 to 14. Such a configuration enables the metal sheets 51a and 52a to be arranged at central portions on the capacitors 11 to 13, which portions generate the most heat by ripple current flowing through the capacitors 11 to 13. By arranging the metal sheets 51a and 52a in the vicinity of the central portions of the capacitors 11 to 13, heat dissipation effect can be improved.

The first bus-bar 154a and the second bus-bar 155a may have different shapes. Specifically, as shown in FIG. 13, an exposed portion 174a of the first bus-bar 154a and an exposed portion 165a of the second bus-bar 155a are formed extending in the height direction (X direction). Such an arrangement of the first bus-bar 154a and the second bus-bar 155a can also present the same effects as in the first embodiment.

Although the present invention has been fully described in relation to the preferred embodiments while referring to the accompanying drawings, it is apparent for those skilled in the art that various modifications and alterations are possible. Without departing from the scope of the present invention defined by the appended claims, such modifications and alterations should be construed as being encompassed therein.

The present invention is useful for capacitors used in various types of electronic equipment, electric equipment, industrial equipment, vehicle devices, etc.

EXPLANATIONS OF REFERENCE NUMERALS 1, 1a to 1b, 2, 2a capacitor module
1a capacitor module
11 to 14 capacitor
21 to 24 first electrode
31 to 34 second electrode
41 to 44 side surface
41a to 44a flat portion
41b to 44b curved portion
51 to 53 metal sheet
54 first bus-bar
55 second bus-bar
61 to 63 main body
64 embedded portion
71 to 73 electrode contact portion
81 to 83 bus-bar contact portion

The invention claimed is:
1. A capacitor module comprising:
a plurality of capacitors each including:
    a first electrode and a second electrode that face each other; and
    a side surface joining the first electrode and the second electrode, the side surface having a pair of flat portions that face each other, and a pair of curved portions that face each other and join the pair of flat portions to each other,
    the plurality of capacitors being arrayed in a row such that the flat portions of adjacent capacitors of the plurality of capacitors face each other;
only a single metal sheet arranged in any of spaces between the flat portions of the adjacent capacitors, the single metal sheet comprising:
    one or more first electrode contact portions extending from the single metal sheet and contacting the first electrode of one capacitor of the adjacent capacitors;
    one or more second electrode contact portions extending from the single metal sheet and contacting the first electrode of a second capacitor of the adjacent capacitors,
    wherein the one or more first electrode contact portions and the one or more second electrode contact portions extend in opposite directions relative to the single metal sheet;
a first bus-bar electrically connected to the single metal sheet; and
a second bus-bar electrically connected to each of the second electrodes of the plurality of capacitors, wherein the first bus-bar is configured as a different member from the single metal sheet and is electrically connected to the single metal sheet.

2. The capacitor module of claim 1, wherein the metal sheet bends in different directions so as to come into contact with the first electrodes of both of the adjacent capacitors.

3. The capacitor module of claim 1, wherein the metal sheet comprises:
- a main body arranged between the respective flat portions of the adjacent capacitors;
- one or more first electrode contact portions extending from the main body and contacting the first electrode of one capacitor of the adjacent capacitors;
- one or more second electrode contact portions extending from the main body and contacting the first electrode of a second capacitor of the adjacent capacitors, wherein the one or more first electrode contact portions and the one or more second electrode contact portions are alternately disposed at intervals; and
- a bus-bar contact portion extending from the main body and contacting the first bus-bar.

4. The capacitor module of claim 3, wherein the bus-bar contact portion is located at a position up to which the main body extends from between the respective flat portions of the adjacent capacitors toward between the respective curved portions of the adjacent capacitors.

5. The capacitor module of claim 4, wherein the bus-bar contact portion lies between the curved portions.

6. The capacitor module of claim 3, wherein the bus-bar contact portion lies between the curved portions.

7. The capacitor module of claim 1, wherein a number of the plurality of capacitors is 2n+1, and a number of the metal sheets is n+1 to 2n, wherein n is a natural number.

8. The capacitor module of claim 1, wherein a number of the plurality of capacitors is 2n, and a number of the metal sheets is n to 2n-1, wherein n is a natural number greater than or equal to 2.

9. The capacitor module of claim 1, wherein a number of the plurality of capacitors is m, and a number of the metal sheets is m-1, wherein m is a natural number greater than or equal to 3.

10. The capacitor module of claim 1, wherein the first bus-bar includes a first exposed portion and the second bus-bar includes a second exposed portion, and the first exposed portion and the second exposed portion are arranged with an interval of approx. 0.5 mm therebetween.

11. The capacitor module of claim 1, wherein the first bus-bar includes an exposed portion, and a cooling portion extending from the exposed portion.

12. The capacitor module of claim 11, further comprising a thermal pad arranged on the cooling portion.

13. A capacitor module comprising:
- a plurality of capacitors each including:
  - a first electrode and a second electrode that face each other; and
  - a side surface joining the first electrode and the second electrode, the side surface having a pair of flat portions that face each other, and a pair of curved portions that face each other and join the pair of flat portions to each other,
  - the plurality of capacitors being arrayed in a row such that the flat portions of adjacent capacitors of the plurality of capacitors face each other;
- only a single metal sheet arranged in any of spaces between the flat portions of the adjacent capacitors, the single metal sheet comprising:
  - one or more first electrode contact portions extending from the single metal sheet and contacting the first electrode of one capacitor of the adjacent capacitors;
  - one or more second electrode contact portions extending from the single metal sheet and contacting the first electrode of a second capacitor of the adjacent capacitors, wherein the one or more first electrode contact portions and the one or more second electrode contact portions extend in opposite directions relative to the single metal sheet; and
  - a bus-bar contact portion extending from the single metal sheet, wherein the bus-bar contact portion lies between the curved portions of the adjacent capacitors;
- a first bus-bar electrically connected to the bus-bar contact portion of the single metal sheet; and
- a second bus-bar electrically connected to each of the second electrodes of the plurality of capacitors.

* * * * *